Nov. 12, 1963  P. BARATOFF ETAL  3,110,464
SHOCK ISOLATORS
Filed Oct. 29, 1959  3 Sheets-Sheet 1
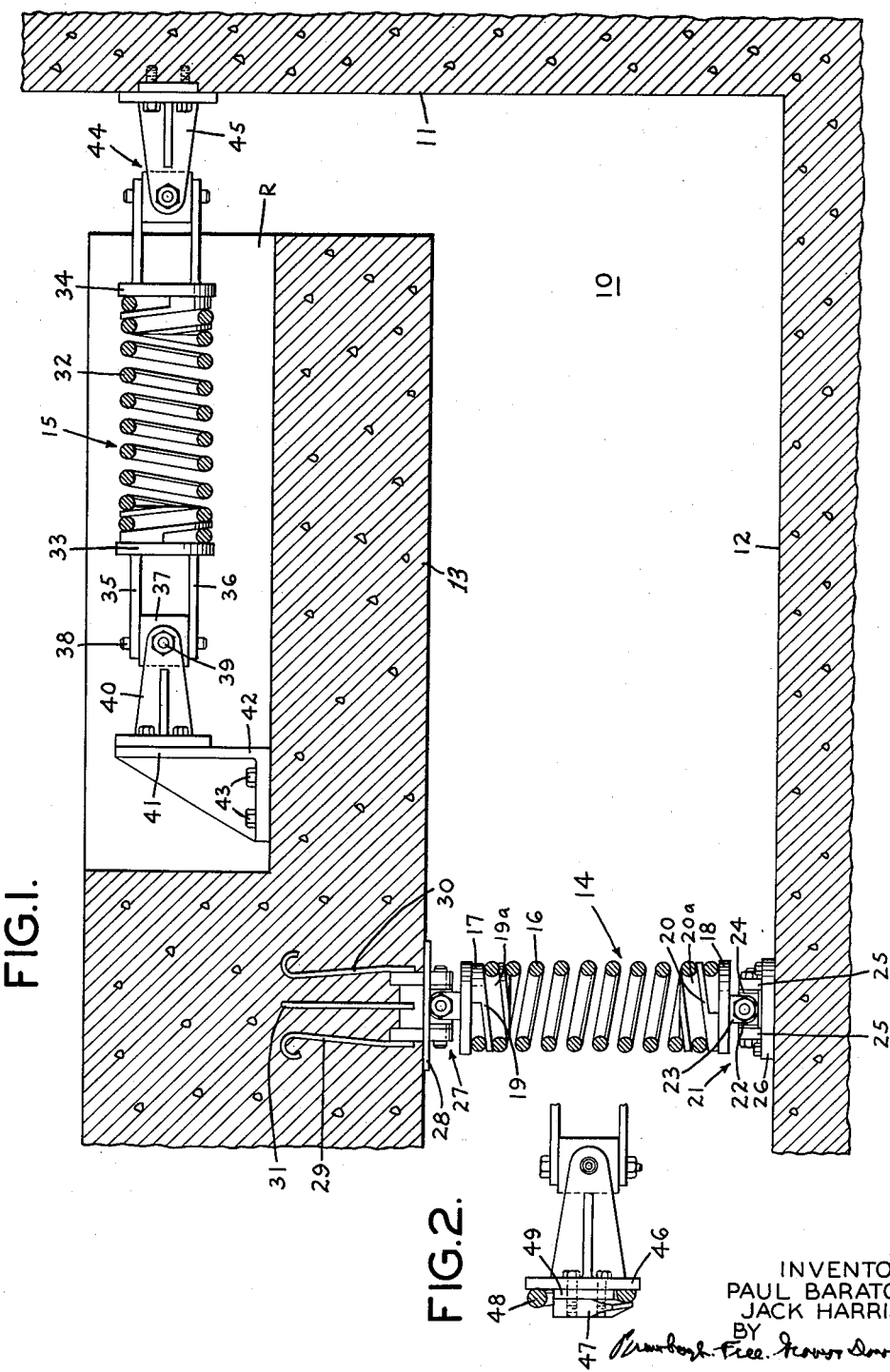
INVENTORS
PAUL BARATOFF
JACK HARRIS
BY
THEIR ATTORNEYS

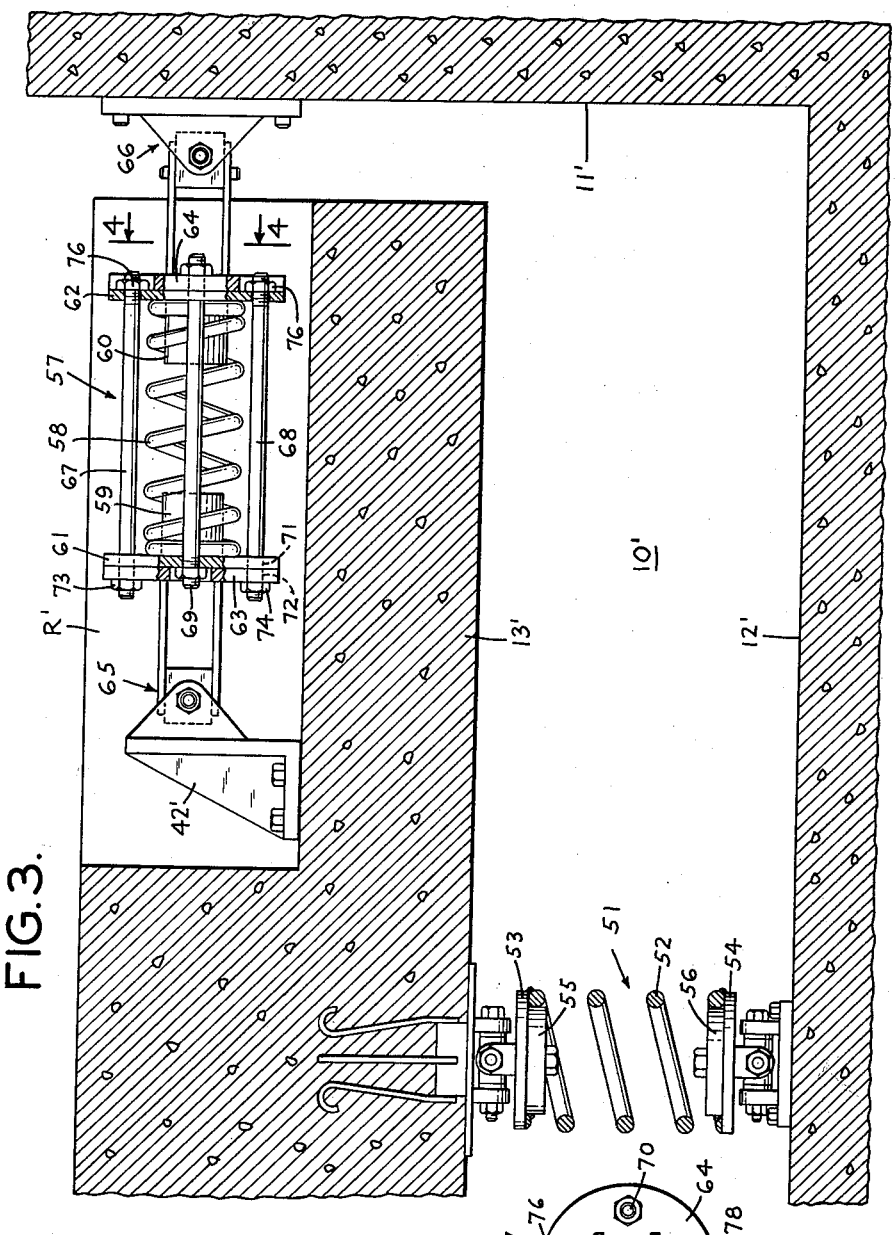

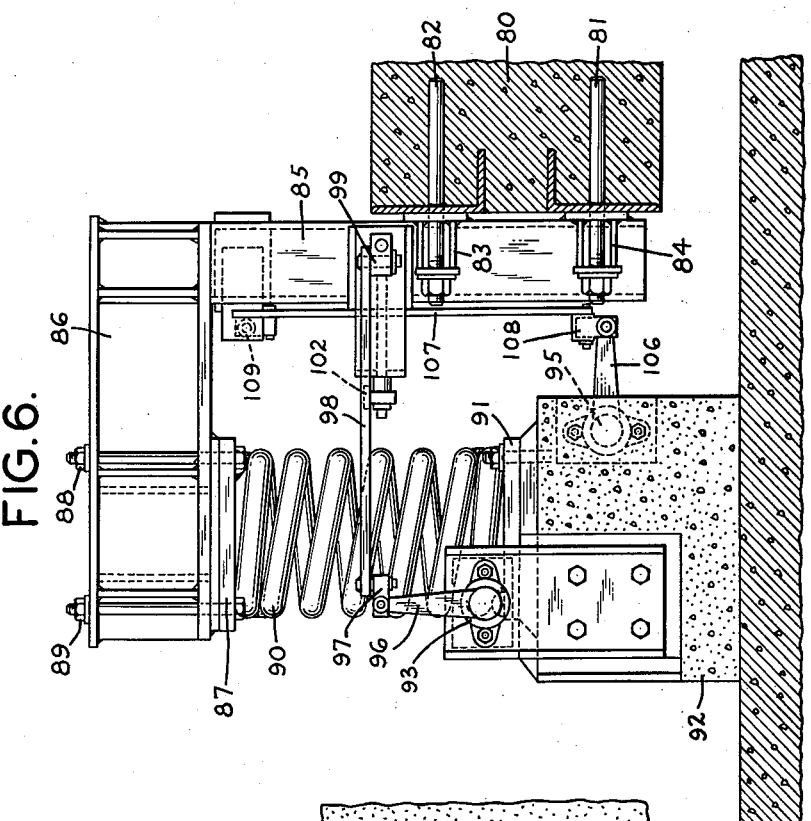
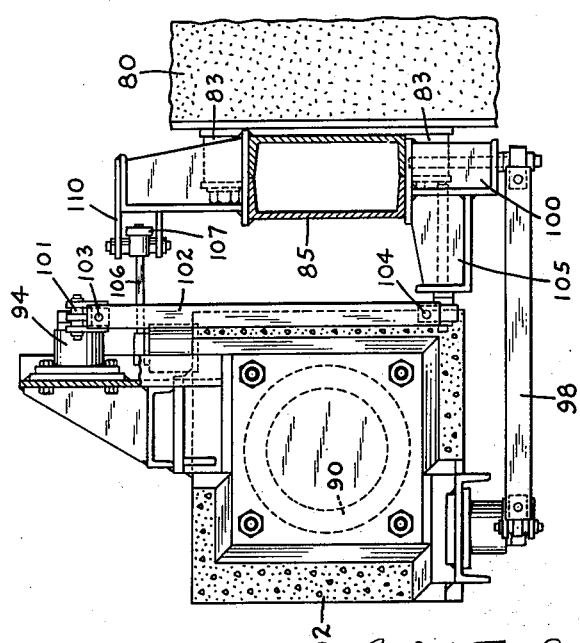

U̇nited States Patent Office 3,110,464
Patented Nov. 12, 1963

3,110,464
SHOCK ISOLATORS
Paul Baratoff, Jackson Heights, and Jack Harris, Forest Hills, N.Y., assignors to Korfund Dynamics Corporation, a corporation of New York
Filed Oct. 29, 1959, Ser. No. 849,614
1 Claim. (Cl. 248—20)

This invention relates to shock reducing devices and it relates particularly to devices for isolating shock or vibrations produced in the platforms and installations due to high accelerations caused by blast of rockets, missiles, and the like, in adjacent areas.

Due to the enormous accelerations which occur during and after the blast of guided missiles, rockets and the like, it has been found desirable to mount equipment to be shock protected on a platform or pad in a pit or other enclosure in such a manner that the platform is isolated from the surrounding area installation.

The art of reducing shock transmission by providing a system having a natural frequency that will attenuate shock waves of a particular pulse form and duration, is well known.

In accordance with the present invention, a novel supporting means is provided for the platform including shock isolators by means of which the platform is supported and is suspended in a pit or enclosure.

More particularly, in accordance with the present invention, a platform such as a reinforced concrete slab is mounted on spring suspension units positioned around the periphery of the platform so that the platform is stabilized and supported. The spring system has an attenuating natural frequency so that movement or vibrations set up in the environment by the shocks are reduced by the spring units to isolate the platform, in effect, from the surrounding area. Each spring suspension unit is characterized by a generally helical spring which is mounted between spring end plates which are so associated with the spring that they can move toward and away from each other in opposition to the resistance of the spring without coming disengaged therefrom. Moreover, the spring mounting plates are connected by means of suitably universal joints or connections at their opposite ends to the platform and the pit structure to thereby permit relatively unrestrained lateral movement of the vertical springs and vertical movement of the horizontal springs thereby to more effectively isolate the shock and vibrations of the platform. By suitably disposing the springs around the platform, the springs are deflected and spaced to give the system the desired natural frequency and the platform is stabilized sufficiently to afford a suitable base for operating equipment, storage, or housing personnel.

For a better understanding of the present invention, reference may be had to the accompanying drawing in which:

FIGURE 1 is a view in vertical section through a portion of a shock protected platform and pit therefor including vertical and horizontal shock isolators embodying the invention;

FIGURE 2 is a fragmentary view of a modified form of spring mounting plate and universal joint for a shock isolator;

FIGURE 3 is a view in vertical section through a portion of a platform and pit showing modified forms of vertical and horizontal shock isolators;

FIGURE 4 is a view in section taken on line 4—4 of FIGURE 3;

FIGURE 5 is a plan view with parts shown broken away of another form of shock isolator, and FIGURE 6 is a side elevational view of the shock-isolator of FIGURE 5 with a portion of the platform shown in section.

The shock isolators described hereinafter can be used for many purposes but, as illustrated herein are shown for dampening vibration and isolating shock in a platform for machinery, delicate instruments, and the like.

As shown in FIGURE 1, an installation may include a pit 10 having side and bottom walls 11 and 12 which may be formed of reinforced concrete or the like. Within the pit and spaced from the walls thereof is a platform 13 which likewise may be formed of reinforced concrete, steel or the like, as the purpose demands. Inasmuch as the reaction forces of a blast are exerted on the pit and surrounding area and it is highly desirable to isolate the shock thereon from the platform, in accordance with the present invention, the platform is centered and located within the pit with capacity for relative movement therein by means of vertical shock isolators 14 and horizontal shock isolators 15. It will be understood that while only one vertical shock isolator 14 and one horizontal shock isolator 15 are shown, as many of the isolators may be provided as is necessary to support the platform 13 in the pit and maintain it in spaced relation to the walls thereof.

The vertical shock isolator 14 shown in FIGURE 1 includes a helical spring 16 of a desired capacity and rate which has its ends secured to the spring mounting plates 17 and 18. Each of the spring mounting plates 17 and 18 includes a threaded disc-like portion 19 or 20 which has a peripheral helical groove 19a or 20a therein for receiving the upper and lower turns of the spring 16. In this way, the mounting plates 17 and 18 are securely connected to the spring and therefore, will not become detached from the spring when the plates are pulled apart to subject the spring 16 to tension.

The lower spring mounting plate 18 is connected to the bottom wall 12 of the pit by means of a universal joint 21 which includes a cross or spider member 22 having one cross arm pivotally connected between spaced lugs 23 extending downwardly from the mounting plate and having its cross arm 24 pivotally connected to the lugs 25 on an anchor plate 26 which is bolted or otherwise secured to the bottom wall 12 of the pit 10.

A similar universal joint 27 connects the upper plate 17 to an anchor plate 28 which is provided with upwardly-extending, hook-like steel rods 29, 30, 31, etc., which are embedded in the platform 13 and thereby secure the mounting plate 28 to the platform. The vertical shock isolators 14 resiliently resist tension and compression stresses resulting from vertical movement of the platform and thereby act to attenuate these stresses.

Inasmuch as the vertical shock isolators 14 have little or no lateral stability, horizontal shock isolators 15 are provided to stabilize the platform in a horizontal direction and also eliminate shock which otherwise would be transmitted from the sidewalls 11 of the pit. The shock isolators 15 are similar to the shock isolators 14 in that each of them includes a helical spring 32 connected to spring mounting plates 33 and 34 which are similar to the spring mounting plates 17 and 18. A pair of spaced arms 35 and 36 project from the plate 33 and pivotally support a block 37 having a shaft 38 extending therethrough and through the arms 35 and 36. A right-angularly related shaft 39 is mounted between the arms of a bifurcated hanger 40 which is secured to the vertical face 41 of an angle plate 42. Bolts or their equivalents secure the angle 42 to the platform 13. In a similar way, spring mounting plate 34 is connected by means of a universal joint 44 to a bracket 45 which is secured by bolts or in any other desired way to the sidewall 11 of the pit. It will be understood that the horizontal shock isolator can be mounted in a recess R in the edge of the platform 13 as shown in FIGURE 1, or in a channel opening downwardly through the bottom surface of the platform or beneath or above the platform, if so desired.

Inasmuch as the platform 13 is suspended in spaced relation to the pit by means of shock isolators, little or none of the shock to which the pit is subjected is transmitted to the platform so that delicate instruments or machinery on the platform are not affected by the shock.

The spring mounting plates 17 and 18 can be modified if desired in order to facilitate their manufacture. Thus, as shown in FIGURE 2, the spring mounting plate 46 may have a mutilated thread member 47 to engage the end of the spring 48. The member 47 is bolted to a disc 49 secured to the face of the spring mounting plate 46 to provide space for reception of the end turn or coil of the spring 48.

Other modifications of the shock isolators are shown, for example, in FIGURES 3 and 4. The vertical shock isolator 51 shown in FIGURE 3 includes a spring 52 which has its opposite ends welded to mounting plates 53 and 54 which may, if desired be provided with centrally located discs 55 and 56 which engage in the ends of the springs. Universal joints connect opposite ends of shock isolator 51 to the bottom wall 12 of the pit 10' and the platform 13'.

Horizontal shock isolator 57, which is mounted in a recess R' in the periphery of the platform 13' includes a helical spring 58 having its ends disposed around the cylindrical blocks 59 and 60 to position the spring against movement transversely of the mounting plates 61 and 62, respectively. Adjacent to the mounting plates 61 and 62 and parallel therewith are other mounting plates 63 and 64 which carry the universal joints 65 and 66 by means of which the shock isolator is connected to the pit wall 11' and the angle member 42' secured to the platform 13'. A cage formed of pairs of diametrically spaced rods 67, 68 and 69, 70, FIGURE 4, connects the plates 61 to 64 in such a manner as to permit compression of the spring 58. Thus, the rods 67 and 68 extend slidably through holes 71 and 72 in the plates 61 and 63 and carry at one end the nuts 73 and 74. The opposite ends of the rod 67 and 68 are slidably engaged in the plate 62 and have nuts 76, 76 on their ends bearing against the plate 62. Plate 64 is provided with notches 77 and 78 which clear the heads of the nuts 76. In a similar way, the rods 69 and 70 slidably engage the end plates 62 and 64 and the plate 61 and have nuts on their ends engaging the plates 61 and 64 when the spring 58 is extended, as shown in FIGURE 3. With this arrangement, it will be apparent that the plates 61 and 63 can move relative to the plates 62 and 64 and the plates 61 and 62 can move relative to the plates 63 and 64. When the platform 13' is urged to the left, as viewed in FIGURE 3, by a stress or shock exerted thereon, the plate 62 is drawn toward the plate 61 away from the plate 64 thereby compressing the spring 58. When the stress is relieved, the spring 58 will force the plates 61 and 62 apart against the end plates 63 and 64, respectively, thereby limiting the extent to which the spring 58 is extended.

Movement of the platform 13' to the right as viewed in FIGURE 3, pushes the plates 61 and 63 toward the plates 62 and 64, thereby compressing the spring 58. In this way, the spring 58 is compressed when the platform 13' is moved either to the right or to the left from the position shown in FIGURE 3 to effectively reduce shock and isolate the platform 13' from the pit 10'.

The platforms described above may be isolated from shock by means of shock isolators such as are shown in FIGURES 5 and 6. This type of shock isolating device does not include horizontally disposed springs but relies for its stability upon vertically-disposed coil springs and the location of the center of gravity of the platform adjacent to the middle of the coil springs.

As shown in FIGURES 5 and 6, a platform 80 is connected by means of pairs of tie rods 81, 82 projecting from the periphery of the platform to laterally-extending, box section brackets or arms 83, 84 on opposite sides of a box section beam or upright 85. It will be understood that each beam 85 may be connected to the platform in any of a number of different ways, for example, by means of tie rods extending vertically from the platform and bolted to a base flange or plate on the lower end of each beam 85.

A cross bar 86 of reinforced I or box girder form is welded or otherwise secured to the beam 85 and extends laterally therefrom. A mounting plate 87 is secured by means of bolts 88, 89 to the bar 86 and is welded to the upper end of a coil spring 90. A mounting plate 91 is bolted or otherwise secured to a concrete block or similar foundation 92 and is welded to the lower end of spring 90. By providing a series of such springs around the periphery of the platform 80, and disposing the platform so that its center of gravity is near the plane of symmetry of the spring, the platform will be held in a relatively stable position while nevertheless being capable of vertical and lateral movements. In order to further control the movements of the platform 80, each shock isolator may be provided with hydraulic shock absorbers or dampeners 93, 94 and 95 or their equivalent, which dampen the movement of the platform in two right, angularly-related directions in a horizontal plane and in a vertical plane. Thus, the shock absorber 93 is provided with an oscillatable arm 96 which is connected by means of a universal joint 97 to one end of a link 98. A universal joint 99 at the right-hand end of the link 98 connects the link 98 to the bracket 100 extending outwardly from the beam 85.

Hydraulic shock absorber 94 also has an oscillatable arm 101 which is connected by means of a link 102 and universal joints 103 and 104 at opposite ends of the link to the bracket 105 extending outwardly from the beam 85, as shown in FIGURE 5.

Shock absorber 95 has an oscillatable arm 106 which by means of a link 107 and universal joints 108 and 109 is connected to the bracket 110 extending from the beam 85. The universal connections between the beam 85 and the shock absorber enable the platform to move in substantially all directions without other restrictions than those imposed by the spring 90 and the shock absorbers 93, 94 and 95. Shock isolator units as shown in FIGURES 5 and 6 effectively isolate the platform 80 from the surrounding terrain and serve the purpose of protecting delicate instrumentation and the like from shocks developed in the surrounding terrain.

It will be understood that the size and number of the shock isolators can be varied and that the arrangement thereof is susceptible to wide variation depending upon requirements. Accordingly, the examples given herein should be considered as illustrative.

We claim:

A shock isolating installation comprising a platform, a support and resilient members interposed between said platform and said support and resiliently opposing movement of said platform in all directions, each resilient member comprising a substantially helical spring, spring mounts connected to opposite ends of said helical spring, at least one spring mount comprising a pair of spring mounting plates adjacent each end of said spring, a first pair of rods connecting one of the spring mounting plates of one pair with a plate of the other pair, rods connecting the other plates of said one and other pairs, said plates connected by said first pair of rods being movable relative to the plates connected by the other pair of rods to compress said spring, a first universal joint interposed between and connecting one spring mount to said platform and another universal joint connecting the other spring mount to said support.

(References on following page)

References Cited in the file of this patent

UNITED STATES PATENTS

| | | |
|---|---|---|
| 949,962 | Nichols | Feb. 22, 1910 |
| 1,514,981 | Merville | Nov. 11, 1924 |
| 1,997,170 | Egen | Apr. 9, 1935 |
| 2,058,185 | Simon | Oct. 20, 1936 |
| 2,412,852 | Wood | Dec. 17, 1946 |

FOREIGN PATENTS

| 615,766 | Germany | July 11, 1935 |
|---|---|---|